United States Patent [19]
Klein et al.

[11] Patent Number: 5,625,981
[45] Date of Patent: May 6, 1997

[54] COMPOSITE WINDOW ASSEMBLY FOR AN AUTOMOTIVE VEHICLE

[75] Inventors: George W. Klein, Dearborn Heights; Richard P. Hunt, Westland; David P. Piontek, Canton; Eric Exner, Woodhaven, all of Mich.

[73] Assignee: ASC Incorporated, Southgate, Mich.

[21] Appl. No.: 472,752

[22] Filed: Jun. 7, 1995

[51] Int. Cl.⁶ .................................................. E05F 11/52
[52] U.S. Cl. ........................ 49/227; 49/351; 296/146.16
[58] Field of Search .......................... 49/226, 227, 351, 49/350; 296/155, 146.14, 146.16

[56] References Cited

U.S. PATENT DOCUMENTS

| | | |
|---|---|---|
| 1,871,844 | 8/1932 | Field ......................................... 49/350 |
| 2,267,471 | 12/1941 | Keller . |
| 2,770,489 | 11/1956 | Garvey et al. . |
| 2,841,441 | 7/1958 | Evans . |
| 3,072,395 | 1/1963 | Pickles . |
| 3,536,354 | 10/1970 | Ingram . |
| 3,544,822 | 12/1970 | Pickles . |
| 3,706,163 | 12/1972 | Pickles . |
| 3,736,702 | 6/1973 | Pickles . |
| 3,823,977 | 7/1974 | Fleravanti . |
| 3,930,339 | 1/1976 | Jander . |
| 3,994,524 | 11/1976 | Lehmann . |
| 4,167,834 | 9/1979 | Pickles . |
| 4,168,595 | 9/1979 | Pickles et al. . |
| 4,170,847 | 10/1979 | Pickles . |
| 4,222,202 | 9/1980 | Pigeon . |
| 4,229,906 | 10/1980 | Pickles . |
| 4,235,117 | 11/1980 | Pickles . |
| 4,389,818 | 6/1983 | Sakamoto . |
| 4,420,906 | 12/1983 | Pickles . |
| 4,487,447 | 12/1984 | Schröder . |
| 4,516,803 | 5/1985 | Kaltz et al. . |
| 4,529,243 | 7/1985 | Kaltz et al. . |
| 4,553,784 | 11/1985 | Trenkler . |
| 4,572,570 | 2/1986 | Treece . |
| 4,573,732 | 3/1986 | Muscat . |
| 4,618,180 | 10/1986 | Muscat . |
| 4,626,021 | 12/1986 | Muscat . |
| 4,687,247 | 8/1987 | Muscat . |
| 4,708,389 | 11/1987 | Maebayashi et al. . |
| 4,712,828 | 12/1987 | Albrecht . |
| 4,720,133 | 1/1988 | Alexander et al. . |

(List continued on next page.)

FOREIGN PATENT DOCUMENTS

| | | |
|---|---|---|
| 0246201 | 11/1987 | European Pat. Off. . |
| 1382296 | 11/1964 | France . |
| 727661 | 4/1955 | United Kingdom . |

OTHER PUBLICATIONS

Seat Ibiza Cabriolet, ASC Incorporated, Brochure, 1988.
1955 Ford Car Shop Manual, Ford Division, Ford Motor Company, pp. 176–186 and p. 3, 1954.
ASC 1991 Nissan 240 Convertible—Regulator, Guide and Quarter Window Installation drawing; offered for sale or used in production prior to Jun. 1994.
Saab Owners Workshop Manual, Haynes Publishing Group 1981, 1986, pp. 234–236.
Ford 1973 Car Shop Manual, vol. 4 Body, pp. 42-03-01, 42-03-04, 42-06-02—42-06-05, 42-07-01—42-46-02, Sep. 1972.
ASC 1991 Nissan 240 Convertible-Quarter Window Assembly drawing; offered for sale or used in production prior to Jun. 1994.

*Primary Examiner*—Kien T. Nguyen
*Attorney, Agent, or Firm*—Harness, Dickey & Pierce, P.L.C.

[57] ABSTRACT

A composite window assembly for use in an automotive vehicle includes a composite guide plate. The composite guide plate is molded from a polymeric material. The guide plate has a plurality of guide structures. Furthermore, a molded polymeric composite sector gear has an integrated extension arm. Moreover, a molded composite window mounting plate is provided. The present invention also provides a guide, retention means and ball bearing construction. A method of manufacturing the present invention is also disclosed.

23 Claims, 3 Drawing Sheets

U.S. PATENT DOCUMENTS

| | | |
|---|---|---|
| 4,741,571 | 5/1988 | Godette . |
| 4,746,163 | 5/1988 | Muscat . |
| 4,778,215 | 10/1988 | Ramaciotti . |
| 4,784,428 | 11/1988 | Moy et al. . |
| 4,799,729 | 1/1989 | Muscat . |
| 4,818,009 | 4/1989 | Muscat . |
| 4,828,317 | 5/1989 | Muscat . |
| 4,830,425 | 5/1989 | Muscat . |
| 4,854,634 | 8/1989 | Shiraishi et al. . |
| 4,905,413 | 3/1990 | Kuki et al. . |
| 4,908,988 | 3/1990 | Yamamura et al. . |
| 4,967,510 | 11/1990 | Torii et al. . |
| 4,986,029 | 1/1991 | Richter .................................. 49/351 X |
| 4,991,348 | 2/1991 | Yamamura et al. . |
| 5,118,158 | 6/1992 | Truskolaski . |
| 5,226,259 | 7/1993 | Yamagata et al. . |
| 5,255,470 | 10/1993 | Dupuy . |
| 5,309,677 | 5/1994 | Kunert et al. . |
| 5,351,443 | 10/1994 | Kimura et al. . |

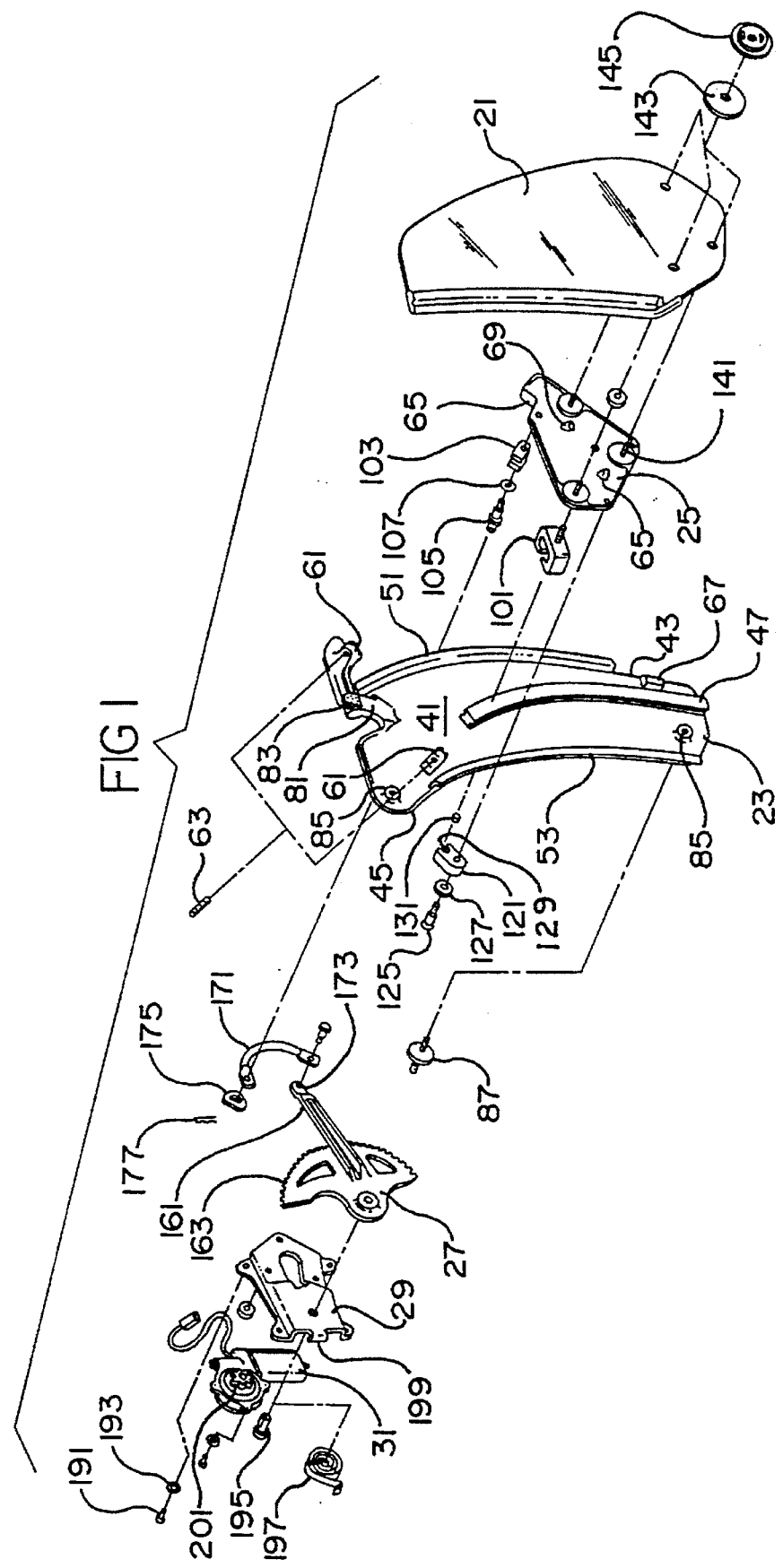

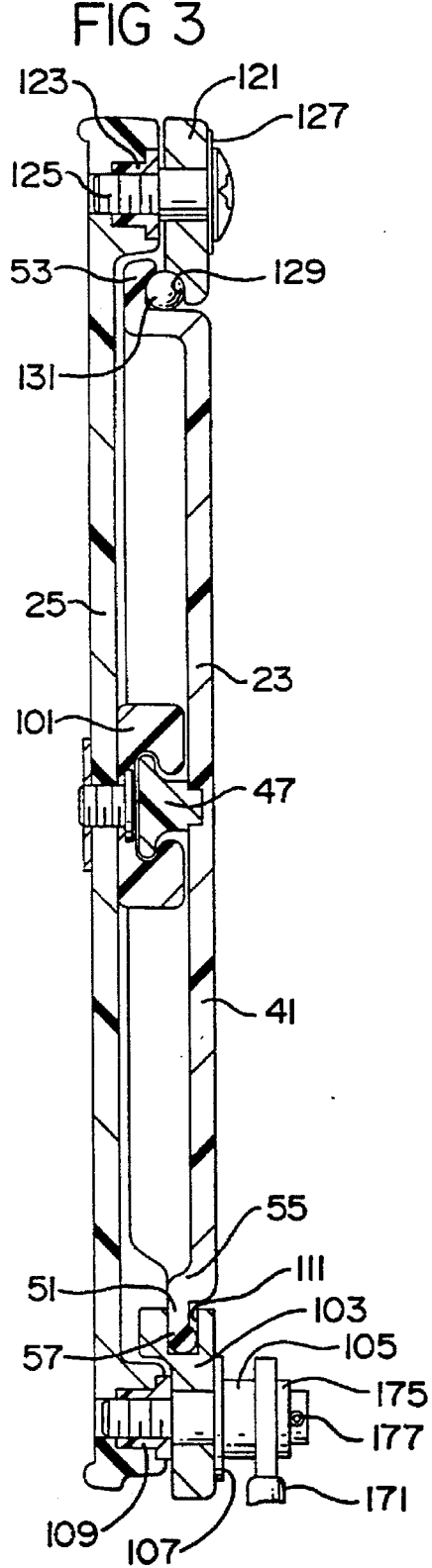
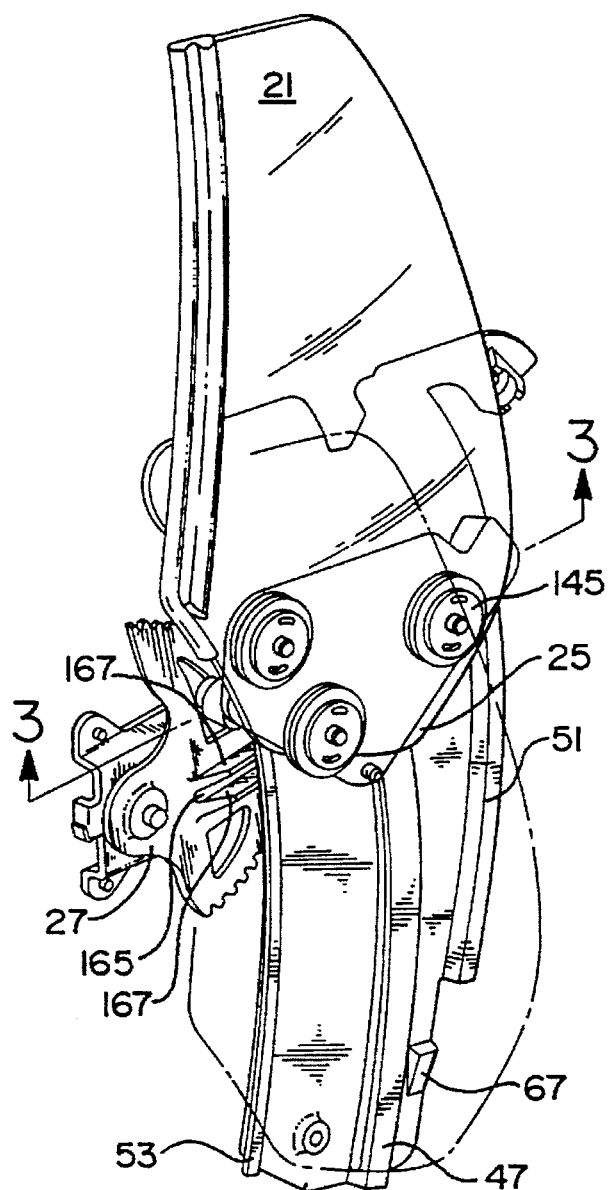

COMPOSITE WINDOW ASSEMBLY FOR AN AUTOMOTIVE VEHICLE

BACKGROUND AND SUMMARY OF THE INVENTION

This invention relates generally to window assemblies and specifically to a composite window assembly used in an automotive vehicle.

Most automotive vehicles employ a window regulator or window lift mechanism for raising and lowering side windows within doors. Many of these window lift mechanisms are driven by fractional horsepower, dc electric motors actuated by a driver accessible switch. One window lift mechanism provides a perforated and flexible tape slidably mounted in a fixed channel track; this is shown in U.S. Pat. No. 4,222,202 entitled "Automotive Tape Drive Window Regulator" which issued to Pigeon on Sep. 16, 1980. It is also well known to provide a pair of crossed arms which act in a scissor-like manner to raise and lower side windows. This conventional construction is shown in U.S. Pat. No. 5,255,470 entitled "Vehicle Door Glass Regulator" which issued to Dupuy on Oct. 26, 1993. Another construction of a traditional manual crank window lift mechanism uses a threaded cable moving within a guide; such a construction is shown in U.S. Pat. No. 3,930,339 entitled "Window Regulator, Especially For Automobiles, With A Threaded Cable Moving In A Guide" which issued to Jander on Jan. 6, 1976. Furthermore, a traditional modular window lift mechanism employs a set of vertically oriented, C-shaped guide rails and a motor driven wire or cable. For instance, reference should be made to U.S. Pat. Nos. 5,351,443 entitled "Automotive Door With Window Pane Lifter Module" which issued to Kimura et al. on Oct. 4, 1994, and 5,226,259 entitled "Automotive Door With Power Window" which issued to Yamagata et al. on Jul. 13, 1993. Such conventional window lift mechanisms are made from relatively heavy metal stampings or castings.

Another conventional window lift mechanism raises and lowers a quarter window for use in a convertible vehicle. This mechanism employs a stamped metal guide plate, a stamped metal window mounting plate and a stamped metal regulator mounting plate. A pair of elongated C-shaped tracks, a pair of upstop retainers and a window tensioner are all welded or riveted to the guide plate. The window mounting plate has a pair of bent tabs upon which polymeric upstop isolator caps are mounted. Three threaded studs are welded or otherwise mounted upon window mounting plate around which polymeric spacers are disposed to prevent window scraping. A metal sector gear is pivotably mounted between the regulator mounting plate and the guide plate. A relatively flat, metallic extension arm, with an offset end, is welded or otherwise attached to the sector gear for movement therewith. The sector gear is driven by an electric motor which can provide approximately 90 inch-pounds of torque.

All of the aforementioned multi-piece, metal constructions are relatively heavy thereby requiring relatively large driving motors. Furthermore, these heavy units are relatively difficult to install, reduce vehicle miles per fuel gallon performance and are susceptible to increased gravitational force damage during usage on bumpy roads. The tracks employed in many of these systems are also difficult and costly to manufacture within the requisite three-dimensional curved shapes. This tolerance miss-matching, in addition to the welding and riveting tolerance build-ups, create extreme friction, wear and binding within the system. This further increases the size of the driving motor and can cause excessive operational noise.

Additionally, many convertible roof assemblies are provided with quarter window retraction mechanisms. Such convertible top systems are shown in the following U.S. patents: U.S. Pat. No. 5,118,158 entitled "Convertible Top Linkage Assembly with Laterally Moving Rear Quarter Windows" which issued to Truskolaski on Jun. 2, 1992; U.S. Pat. No. 4,828,317 entitled "Convertible Top Frame with Quarter Windows" which issued to Muscat on May 9, 1989; U.S. Pat. No. 4,784,428 entitled "Apparatus and Method of a Convertible Top with Hard Glass with Bottom Sealing" which issued to Moy et al. on Nov. 15, 1988; U.S. Pat. No. 4,778,215 entitled "Flexible Roof for Motor Vehicles" which issued to Ramaciotti on Oct. 18, 1988; U.S. Pat. No. 3,536,354 entitled "Vehicle Bodies" which issued to Ingram on Oct. 27, 1970; and 2,267,471 entitled "Collapsible Top for Motor Vehicles" which issued to Keller on Dec. 23, 1941; all of which are incorporated by reference herewithin. Most of these units mechanically couple the window movement to retraction of the roof linkages.

In accordance with the present invention, the preferred embodiment of a composite window assembly for use in an automotive vehicle includes a composite guide plate. In another aspect of the present invention, the composite guide plate is molded from a polymeric material. In a further aspect of the present invention, the guide plate has a pair of auxiliary guide structures integrally extending proximate with edges thereof. In yet another aspect of the present invention, a pair of stop retaining bosses and a window tensioner are integrally molded as part of the composite guide plate. In still another aspect of the present invention, a T-shaped main guide structure is centrally provided on the composite guide plate. Another aspect of the present invention provides a molded polymeric composite sector gear with an integrated extension arm. Moreover, in still another aspect of the present invention, a molded composite window mounting plate with integral stops is provided. Another aspect of the present invention provides a guide, retention means and ball bearing construction. A method of manufacturing the present invention is also disclosed.

The composite window assembly of the present invention is advantageous over traditional constructions in that the present invention achieves lightweight and more accurately formed composite components. This is accomplished by molding various components from a polymeric material and by integrating multiple members into single units. Therefore, part tolerances are improved while lighter weight materials are employed thereby creating less part-to-part friction and weight; this also allows for use of a sign driving electrical motor. The polymeric material used is also inherently lubricous so as to further reduce part interfacing friction, window scraping and the need for messy lubricants. The present invention is further advantageous by reducing parts, reducing tooling costs, reducing piece costs, eliminating the need for painting, reducing part stress, improving part accuracy, and reducing operational noise. In fact, it has been found that the production tooling costs needed to produce the composite guide plates and composite window mounting plate are over four and one half times less than that of conventional tooling. Production piece cost is believed to be over four times less expensive than that of conventional metal parts. Moreover, the composite window assembly of the present invention allows for miniaturization of components and modularized assembly. Additional advantages and features of the present invention will become apparent from the following description and appended claims, taken in conjunction with the accompanying drawings.

BRIEF DESCRIPTION OF THE DRAWINGS

FIG. 1 is an exploded perspective view showing the preferred embodiment of a composite window assembly of the present invention;

FIG. 2 is a perspective view showing the preferred embodiment composite window assembly of the present invention;

FIG. 3 is a cross sectional view, taken along line 3—3 of FIG. 2, showing the preferred embodiment composite window assembly of the present invention.

DETAILED DESCRIPTION OF THE PREFERRED EMBODIMENT

Figure 4:
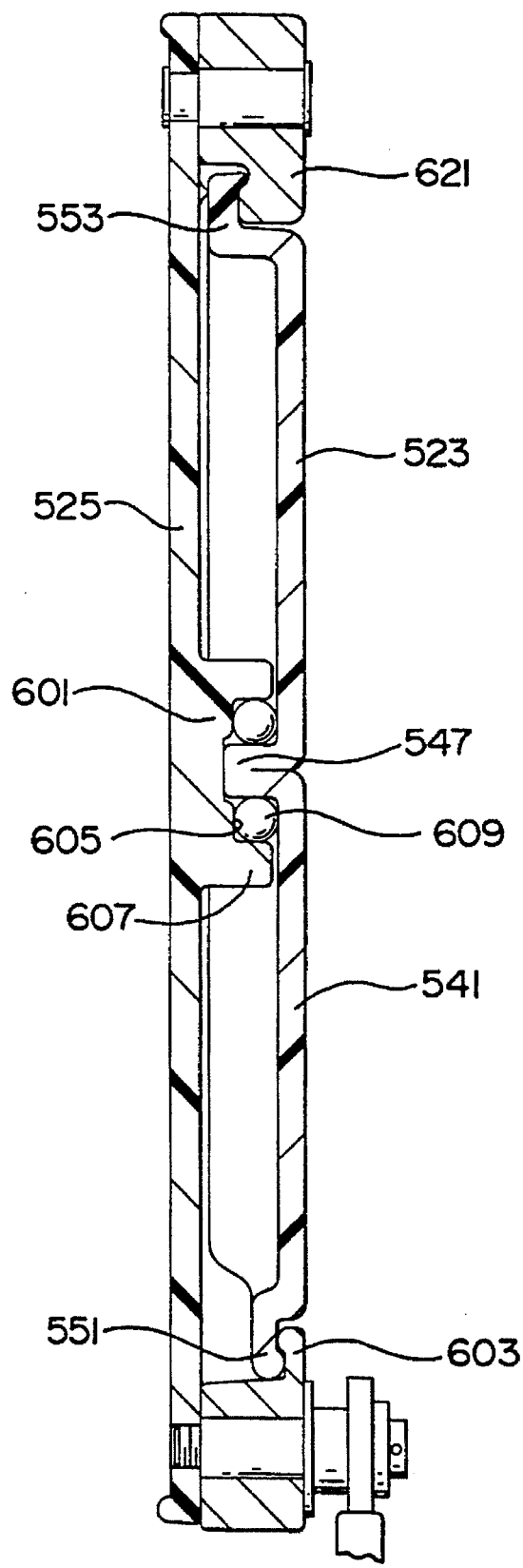
FIG. 4 is cross sectional view, similar to that of FIG. 3, showing an alternate embodiment of the composite window assembly of the present invention.

The preferred embodiment composite window assembly of the present invention is intended for use in combination with a soft-top or hard-top convertible roof assembly in an automotive vehicle. In particular, a quarter window 21 seals against a side rail of the convertible roof assembly when window 21 is fully raised. However, quarter window 21 must be lowered before or concurrently with retraction of the convertible roof assembly to prevent interference. Quarter window 21 can further be raised or lowered independent from movement of the convertible roof assembly. The composite window assembly of the present invention further includes a composite guide plate 23, a composite window mounting plate 25, a composite sector gear 27, a composite cover plate 29 and an electric motor 31.

Guide plate 23 has a body panel 41 bordered by a first generally vertical edge 43 and an opposite second, generally vertical edge 45. A main guide structure 47 is centrally mounted upon body 41 through sonic welding, heat staking or other such heat generating, permanent bonding techniques. Of course, rivets, screws, snap fits or dovetail-type attachments may alternately be employed. Guide plate 23 and main guide structure 47 are both separately injection molded from a polymeric material such as glass-filled nylon 6/6. Alternately, main guide structure 47 can be integrally molded as part of guide plate 23. Main guide structure 47 has a generally T-shaped cross sectional configuration and is generally vertically elongated. Main guide structure 47 additionally has a three-dimensional curve along its elongated longitudinal orientation.

A pair of auxiliary guide structures 51 and 53 are integrally formed with body 41 of guide plate 23. Within each auxiliary guide structure 51 and 53, a first wall 55 projects substantially perpendicular from body 41 of guide plate 23 while a second offset wall 57 is oriented generally parallel to body 41. A pair of upstop bosses 61 are also integrally molded as part of guide plate 23. Each upstop boss 61 has a passageway within which an adjustable threaded upstop 63 is enmeshed. Upstops 63 abut against congruent upstop members 65 integrally formed as part of window mounting plate 25. A downstop formation 67 is also integrally molded as part of guide plate 23 for operably abutting against a downstop member 69 integrally molded and projecting from window mounting plate 25. A window tensioner 81 is further integrally molded as part of guide plate 23 and has a felt patch 83 adhered thereupon. Felt patch 83 rubs against quarter window 21 for preventing window rattle. A set of mounting bosses 85 are integrally formed as part of guide plate 23 such that adjustment bolts 87 extend therethrough for mounting to the adjacent quarter inner panel of the automotive vehicle body.

A carriage 101 is bolted, sonic welded or otherwise attached onto window mounting plate 25. A substantially C-shaped cavity within carriage 101 slidably engages about main guide structure 47. Furthermore, a thrust shoe 103 is securely retained to window mounting plate 25 by a partially threaded bolt 105 and washer 107. An expandable brass insert 109 is also disposed between the threaded portion of bolt 105 and the registering aperture of window mounting plate 25. Thrust shoe 103 has a receptacle 111 for slidably engaging around offset wall 57 of auxiliary guide structure 51.

On the opposite side of window mounting plate 25, a retention shoe 121 is attached to an expandable brass insert 123 and window mounting plate 25 by a partially threaded bolt 125 and washer 127. Retention shoe 121 further has a receptacle 129 for receiving a steel ball bearing 131 which movably rides against auxiliary guide structure 53. This provides a very smooth, low friction and wear resistant interface.

Window mounting plate 25 is also injection molded from glass-filled nylon 6/6. Three threaded studs 141 are integrally molded or insert molded as part of window mounting plate 25. These studs 141 extend through matching holes within quarter window 21, without spacers therebetween, and are secured thereto by nylon bushings 143 and annular internally threaded retainers 145 on the opposite face of window 21.

Sector gear 27 has an extension arm 161 integrally extending therefrom past a set of teeth 163. Extension arm 161 and sector gear 27 are both injection molded from glass-filled nylon 6/6 as a single unit. Extension arm 161 has a substantially flat face 165 bordered by a pair of upstanding trusses 167. A bent steel, tubular thrust linkage 171 has a first flattened end pivotably coupled to an offset end 173 of extension arm 161 by a shoulder rivet or bolt. An opposite flattened end of thrust linkage 171 is pivotably coupled to bolt 105 by a Belleville washer 175 and cotter pin 177. Thus, rotated movement of sector gear 27 and extension arm 161 causes thrust linkage 171 to raise and lower window mounting plate 25 and the attached quarter window 21.

Cover plate or bracket 29 is attached to guide plate 23 through a plurality of bolts 191 and washers 193. Furthermore, sector gear 27 is mounted about a pivot pin 195 mounted to cover plate 29. An inner leg of a spring steel clock spring 197 engages within a slot of pivot pin 195 while an outer leg of clock spring 197 abuts against an integral flange 199 of cover plate 29. Clock spring 197 serves to provide a preloaded bias thereby assisting in raising window 21. Cover plate 29 is also injection molded from a glass-filled nylon 6/6 polymeric material.

Electric motor 31 is mounted to cover plate 29 such that a pinion gear 201 enmeshably drives teeth 163 of sector gear 27. Electric motor 31 is of a fractional horsepower, dc variety. However, due to the lightweight composite components employed in the present invention and due to the reduced frictional losses, electric motor 31 needs to only generate approximately 45 inch-pounds of torque for raising and lowering quarter window 21. This further serves to reduce piece cost, packaging space and operational noise.

FIG. 4 illustrates an alternate embodiment of the composite window assembly of the present invention. In this embodiment, guide plate 523 and window mounting plate 525 can be compression molded from polymeric sheet molding compound, stamped from steel, cast from aluminum or injection molded. Guide plate 523 further has a main guide structure 547 extending generally perpendicular from body 541. Guide plate 523 further has a pair of generally L-shaped auxiliary guide structures 551 and 553. A carriage 601 is integrally formed as part of window mounting plate 525 and has an outer pair of tabs 607 and a pair of inner shelves 605 for receiving ball bearings 609. Ball bearings 609 movably ride between carriage 601, and main guide structure 547 and body 541 of guide plate 523. A thrust shoe 603 and a retention shoe 621 directly ride along auxiliary guide structures 551 and 553, respectively. Of course, ball bearings may be employed between one or both of the shoes and auxiliary guides structures.

While the preferred embodiment of this composite window assembly of the present invention has been disclosed, it will be appreciated that various modifications may be made without departing from the present invention. For example, a front door, a rear door or even tailgate window may employ various of the mechanisms of the present invention with or without a convertible roof. Furthermore, the various plates, shoes and extension arms may have differing shapes from those disclosed. Moreover, differing ball bearing race configurations and locations can be used. Various materials and fasteners have been disclosed in an exemplary fashion, however, a variety of other materials and fasteners may of course be employed. It is intended by the following claims to cover these and any other departures from the disclosed embodiments which fall within the true spirit of this invention.

The invention claimed is:

1. A window assembly for use in an automotive vehicle comprising:
    a window guide plate having a body with a projecting main guide structure, said guide plate body and main guide structure being molded from a polymeric material and permanently secured together whereby a lightweight, composite unit is achieved;
    a composite sector gear and arm being integrally molded from a polymeric material, said arm having a base surface with an aperture at an end of said arm, and a set of trusses upstanding from said base surface;
    a cover plate being molded from a polymeric material having an extending offset flange, said sector gear being pivotably mounted upon said cover plate;
    a clock spring being coupled to a pivot pin upon which said sector gear is mounted, a leg of said clock spring engaging with said flange of said cover plate; and
    an electric motor having a pinion gear enmeshed with said sector gear, said motor being mounted upon said cover plate, said motor being operable for driving a window between a raised position and a lowered position.

2. The window assembly of claim 1 wherein said guide plate further includes:
    a first auxiliary guide structure integrally molded along a first edge of said guide plate;
    a second auxiliary guide structure integrally molded along a second and opposite edge of said guide plate; and
    said auxiliary guide structures being elongated in substantially the same direction as said main guide structure.

3. The window assembly of claim 2 wherein said main guide structure has a substantially T-shaped cross section for slidable engagement by a substantially C-shaped cavity of a carriage.

4. The window assembly of claim 3 further comprising:
    a window mounting plate molded from a polymeric material and having an integrally projecting stop member, said carriage mounted upon said window mounting plate;
    a quarter window affixed to said window mounting plate directly against a surface opposite from said carriage; and
    a stop formation integrally molded and extending from said body of said guide plate for abutting against said stop member of said window mounting plate.

5. The window assembly of claim 4 further comprising:
    a thrust shoe secured to said window mounting plate and slidably interfaceable against an external and offset surface of said first auxiliary guide structure; and
    a retention shoe secured to said window mounting plate and slidably interfaceable against an external and offset surface of said second auxiliary guide structure.

6. The window assembly of claim 5 further comprising a thrust linkage being pivotably coupled to said thrust shoe and to said aperture in said arm.

7. The window assembly of claim 1 further comprising a window tensioner integrally molded as part of said guide plate.

8. A window assembly for use in an automotive vehicle comprising:
    a window mounting plate molded from a polymeric material and having an integrally projecting stop member;
    a carriage mounted upon said window mounting plate;
    a window affixed to said window mounting plate directly against a surface opposite from said carriage; and
    a pair of shoes secured to said window mounting plate and each having inwardly oriented receptacles facing each other.

9. A window assembly for use in an automotive vehicle comprising:
    a window mounting plate molded from a polymeric material and having an integrally projecting stop member;
    a carriage mounted upon said window mounting plate;
    a window affixed to said window mounting plate directly against a surface opposite from said carriage; and
    a set of integrally molded studs projecting from said window mounting plate for securing said window.

10. A window assembly for use in an automotive vehicle comprising:
    a window mounting plate molded from a polymeric material and having an integrally projecting stop member;
    a carriage mounted upon said window mounting plate;
    a window affixed to said window mounting plate directly against a surface opposite from said carriage; and
    second and third stops integrally molded as part of said window mounting plate, said window being defined as a quarter window.

11. A window assembly for use in an automotive vehicle comprising a sector gear and arm integrally molded from a polymeric material, said arm having a base surface with a set of upstanding trusses, said sector gear including a pivot axis positioned opposite from an offset end of said arm, teeth of said sector gear being disposed between said offset end and said pivot axis.

12. A window assembly for use in an automotive vehicle comprising a sector gear and arm integrally molded from a polymeric material, said arm having a base surface with a set of upstanding trusses, a quarter window being mounted upon a window mounting bracket, said window mounting bracket being movably coupled to an end of said arm.

13. A window assembly for use in an automotive vehicle comprising:

a set of guide structures;

a window mounting plate;

means for interfacing with at least one of said set of guide structures being mounted to said window mounting plate; and a ball bearing movably disposed between said interfacing means and said one of said set of guide structures.

14. The window assembly of claim 13 wherein said set of guide structures includes:

a main guide structure projecting from a substantially central portion of a guide plate; and a pair of auxiliary guide structures projecting from edges of said guide plate, at least a portion of said auxiliary guide structures being offset from a body of said guide plate.

15. The window assembly of claim 14 wherein said pair of auxiliary guide structures are integrally molded with said guide plate from a polymeric material.

16. The window assembly of claim 13 wherein said interfacing means includes a shoe having a receptacle for receiving a portion of said ball bearing, a portion of said shoe disposed on an opposite side of an adjacent one of said set of guide structures from said window mounting plate.

17. The window assembly of claim 13 wherein said interfacing means includes a carriage extending from a substantially central portion of said window mounting plate, said ball bearing riding between said carriage and one of said set of guide structures.

18. A window assembly for use in an automotive vehicle comprising:

a guide plate;

a main guide structure projecting from a substantially central portion of said guide plate;

a pair of auxiliary guide structures projecting from edges of said guide plate;

said pair of auxiliary guide structures each having a first wall extending substantially perpendicular from an adjacent edge of a body of said guide plate, each of said pair of auxiliary guide structures further having an offset wall projecting outwardly from said first wall, said offset walls being substantially parallel to said body of said guide plate; and a window mounting plate slidably coupled to said guide structures.

19. The window assembly of claim 18 wherein said main guide structure has a substantially T-shaped cross section for slidable engagement by a carriage.

20. The window assembly of claim 18 further comprising:

said window mounting plate having an integrally projecting stop member, said carriage mounted upon a window mounting plate;

a quarter window affixed to said window mounting plate directly against a surface opposite from said carriage; and a stop formation integrally molded and extending from said body of said guide plate for abutting against said stop member of said window mounting plate.

21. The window assembly of claim 18 further comprising:

a thrust shoe secured to said window mounting plate and slidably interfaceable against an external and offset surface of said first auxiliary guide structure; and a retention shoe secured to said window mounting plate and slidably interfaceable against an external and offset surface of said second auxiliary guide structure.

22. A window assembly for use in an automotive vehicle comprising a guide plate having a surface suitable for mounting to an automotive vehicle body, a T-shaped guide structure projecting from said surface, said guide structure further being an elongated member arcuately oriented in a substantially vertical manner when assembled to said automotive vehicle body.

23. A window assembly for use in an automotive vehicle comprising:

a window guide plate having a body with a projecting main guide structure, said guide plate being molded from a polymeric material whereby a lightweight, composite unit is achieved, said guide plate further including:

a first auxiliary guide structure being integrally molded along a first edge of said guide plate;

a second auxiliary guide structure being integrally molded along a second and opposite edge of said guide plate; and said auxiliary guide structures being elongated in substantially the same direction as said main guide structure.

\* \* \* \* \*

UNITED STATES PATENT AND TRADEMARK OFFICE
CERTIFICATE OF CORRECTION

PATENT NO. : 5,625,981
DATED : May 6, 1997
INVENTOR(S) : George W. Klein; Richard P. Hunt; David P. Piontek; Eric Exner It is certified that error appears in the above-indentified patent and that said Letters Patent is hereby corrected as shown below:

Column 1, line 64, "are-also" should be -- are also --.

Column 2, line 51, "sign" should be -- significantly smaller --.

Column 5, line 13, "0f" should be -- Of --.

Signed and Sealed this

Fourteenth Day of October, 1997

Attest:

BRUCE LEHMAN

Attesting Officer

Commissioner of Patents and Trademarks